Aug. 6, 1929.　　　T. WALLACE　　　1,723,590
FILM HOLDER
Filed Feb. 19, 1927
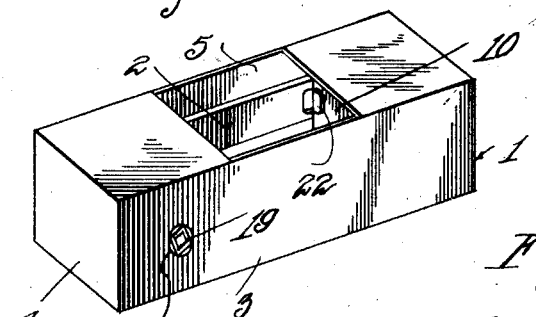
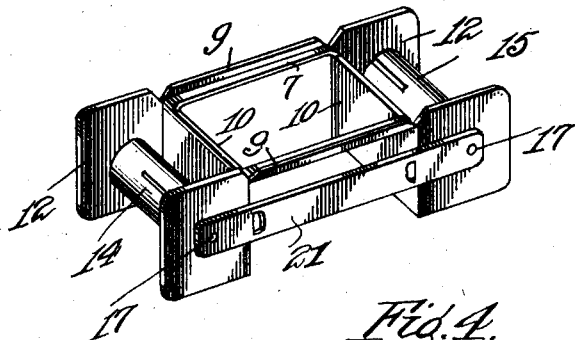
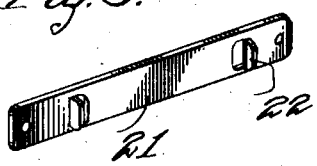
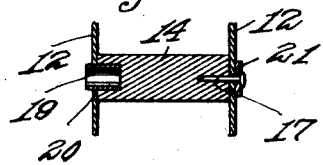
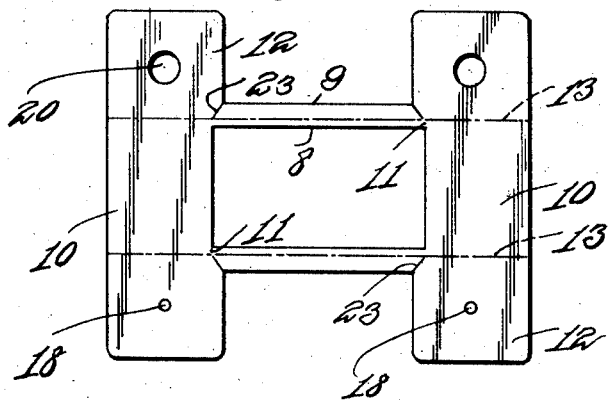
Inventor
Thomas Wallace, Deceased
by Daniel J. Cosgro & Henry E. Ahern, Executors
By J. S. Carpenter
Attorney Patented Aug. 6, 1929.

1,723,590

UNITED STATES PATENT OFFICE.

THOMAS WALLACE, DECEASED, LATE OF NEW YORK, N. Y., BY DANIEL J. COSGRO, OF COHOES, NEW YORK, AND THE CHATHAM AND PHENIX NATIONAL BANK OF THE CITY OF NEW YORK, EXECUTORS, ASSIGNORS, BY MESNE ASSIGNMENTS, TO MAURICE C. GENNERT, OF SOUTH PLAINFIELD, NEW JERSEY.

FILM HOLDER.

Application filed February 19, 1927. Serial No. 169,577.

The present invention has reference generally to improvements in that class of inventions known as photography, and more particularly relates to an improved film holder.

As the primary aim and object the invention contemplates the provision of a film holder of novel construction, especially adapted for use in a camera of the type shown in the patent to M. Niell granted January 31, 1911, and numbered 982,849.

The invention has as one of its particular objects the provision of a film holder of the character mentioned embodying a casing having an opening for coacting with the shutter of the camera, and another opening for coacting with the film winder, the casing being combined with an improved roll and film supporting frame which is arranged in the casing in such manner as to be ready for instant use when the casing is placed in the camera.

As an additional and equally important object the invention consists in the provision of a film roller supporting frame designed to operatively receive and support both of the film rollers and to guide the film during its passage from one roller to the other.

It is a more specific object of this invention to provide a device of the above character, wherein means is provided for reinforcing the roller supporting frame.

Among the other aims and objects of the invention may be recited the provision of a device of the above character with a view to compactness and wherein the number of parts are few, the construction simple, the cost of production low, and the efficiency high.

Further objects, as well as other features, and scope of this invention will be more readily apparent from the following description taken in connection with the accompanying drawings and pointed out in the claims forming a part of this specification.

The invention is clearly illustrated in the accompanying drawings, in which:—

Figure 1 is a perspective view of the casing with the frame arranged therein ready for use.

Figure 2 is a perspective view of the frame with the rollers mounted therein.

Figure 3 is a plan view of the blank forming the frame.

Figure 4 is a transverse sectional detail through the frame showing the means for mounting one of the rollers, and Figure 5 is a perspective detail of one of the braces.

Similar characters of reference are employed in all of the above described views to indicate corresponding parts thereof.

Referring now more particularly to the accompanying drawings, there is provided a casing designated generally by the numeral 1 for removably receiving a film and roller supporting frame indicated in its entirety by the numeral 2.

In the present instance the casing 1 may be said to consist of a hollow rectangular body 3 of relatively stiff paper having end closure flaps 4, one wall of the body (preferably the bottom when in actual use) being provided with an opening 5 for coacting with the shutter of a camera of the type mentioned. In addition, one side wall of the body is provided with an aperture 6 for coacting with the film winder of the camera to the extent of permitting passage of the winding stem (not shown) therethrough, so as to effect engagement with one of the rollers in the frame.

As intimated, the frame 2 is of improved construction and generally consists of U-shaped roller supporting brackets connected in spaced relation with their medial portions facing each other. In the present instance the frame is desirably formed from a single blank of sheet metal as shown in Figure 3. The blank includes a body 7 of a rectangular shape having a correspondingly shaped opening 8 therein and of a size almost equal to the body so as to leave opposed strips.

Relatively narrow flanges 9 continue from the longitudinal sides of the strips or body and then folded as indicated in Figure 2 to form film guides. End flanges 10 also continue from the body and are foldable on the lines or creases 11 to lie at right angles to the body and in addition are formed with side flanges 12 which are foldable on the lines or creases 13 to lie at right angles to the end flanges 10 and longitudinally of the body 7, as shown in Figure 2. These flanges 10 and 12 form in effect U-shaped roller receiving and supporting brackets in which are journaled the rollers 14 and 15. One end of each roller is mounted by means of a headed fastener 17 which is journaled through an opening 18 in one of the side flanges or brackets 12 and is anchored in the roller, while the opposite end of each roller receives a sleeve 19 which is journaled in an opening 20 in the opposite and adjacent flange 12. Each sleeve 19 is formed with a square interior while the frame is arranged in the casing with the body 7 spaced opposite the opening 5, and with one of the sleeves 19 aligning with the opening 6, so that the winding stem (not shown) of the camera may be engaged therewith.

As the frames are of light sheet metal, such as tin, and as they are subjected to considerable strain when in use it has been found expedient to reinforce the same. In accomplishing this purpose a strip 21 of metal is arranged longitudinally of the side of the frame being secured to the aligning side flanges 12 by the fasteners 17 and have lugs 22 struck out therefrom and engaged with the inner opposed surfaces of the end flanges 10. By this arrangement movement of the end flanges 10 relatively to the body 7 and accidental breaking of the strips near the slits 23 is reduced to a minimum. It may be stated that these slits 23 are necessary at the points indicated in Figure 3 so that the side edges of the side flanges 12 upon the completion of the frame 2, will lie flush with the outer edges of the relatively narrow flanges or guides 9 and consequently allow for the even resting of the frame in the casing. In addition, attention is directed to the fact that the end flanges 10 coact with the casing in preventing those portions of the film on the rollers from being affected by light.

By reason of the foregoing construction and arrangement the following advantages will be noted. The frame 2, when the film (not shown) has been arranged thereon, is inserted in the casing 1, while the latter is adapted to be placed in a box (not shown), the article now being ready for sale. In use it is only necessary to remove the casing from the box and insert the same in the camera. Subsequent to the taking of pictures the casing may be removed and the frame in turn removed from the casing in order that the film may be developed.

In view of the foregoing it is thought that the construction will be fully apparent and that a further detailed description of the invention is entirely unnecessary. Likewise it is believed that the advantages of the invention will be readily apparent.

Having thus fully described the invention what is claimed as new and desired to be secured by Letters Patent is:—

1. A film holder including a casing having openings for coacting with the shutter of a camera and with its film winder, and a film supporting frame including supply and take-up rollers operably mounted in the casing.

2. A film holder including a casing having openings for coacting with the shutter of a camera and with its film winder, a film supporting frame operably mounted in the casing, supply and take-up rollers carried by the frame, and said frame having end flanges for coacting with the end portions of the casing in preventing the action of light on the rolled portions of a film.

3. A film holder including a casing having openings for coacting with the shutter of a camera and with its film winder, a film supporting frame operably mounted in the casing, supply and take-up rollers carried by the frame, and said frame being provided with substantially U-shaped brackets integrally connected in spaced relation with the medial portions facing each other.

4. A film holder including in combination a casing having openings for cooperating with the shutter of a camera and with its thin winding stem, a frame in the casing having substantially U-shaped brackets, means integral with the brackets for connecting the same in spaced relation with their medial portions facing each other, means for reinforcing the frame, and film receiving rollers journaled in the brackets.

5. In a film holder of the character described, a frame formed from a single blank including a body having an opening therein and leaving opposed strips, integral flanges on the strips and coacting therewith to form film guides, integral end flanges arranged at right angles to the body and integral side flanges arranged at right angles to the end flanges and projecting longitudinally from the body and coacting with the end flanges to form roller supporting brackets.

6. In a film holder of the character described, a frame formed from a single blank and provided with brackets, film receiving rollers arranged in said brackets, means for journaling said rollers in said brackets, and a reinforcing strip embracing side flanges of said brackets and secured thereto by the journaling means for said rollers.

7. A film holder of the character described formed from a single blank and having oppositely arranged brackets, film rollers arranged in said brackets, strips connecting said brackets, and said strips serving as guides for a film during its movement from one roller to the other.

In testimony whereof we affix our signatures.

DANIEL J. COSGRO,
THE CHATHAM & PHENIX NATIONAL
BANK OF THE CITY OF NEW YORK,
*Executors for the Estate of Thomas Wallace, Deceased.*
By H. C. AHERN,
*Trust Officer.*